United States Patent
Wallace et al.

(10) Patent No.: US 7,581,632 B2
(45) Date of Patent: Sep. 1, 2009

(54) SEQUENTIAL DIVERTER FOR NARROW BELT CONVEYOR AND ASSOCIATED METHODS

(75) Inventors: Matthew Earl Wallace, Grand Rapids, MI (US); Andew Knaut, Grand Rapids, MI (US)

(73) Assignee: TGW-Ermanco Inc., Spring Lake, MI (US)

( * ) Notice: Subject to any disclaimer, the term of this patent is extended or adjusted under 35 U.S.C. 154(b) by 120 days.

(21) Appl. No.: 11/688,535

(22) Filed: Mar. 20, 2007

(65) Prior Publication Data

US 2007/0284218 A1    Dec. 13, 2007

Related U.S. Application Data

(60) Provisional application No. 60/812,286, filed on Jun. 9, 2006.

(51) Int. Cl.
  *B65G 47/54*   (2006.01)
  *B65G 13/10*   (2006.01)

(52) U.S. Cl. ............ 198/370.08; 198/442; 198/457.02; 198/598; 198/817

(58) Field of Classification Search ............ 198/370.09, 198/370.08, 370.1, 442, 457.02, 598, 817
See application file for complete search history.

(56) References Cited

U.S. PATENT DOCUMENTS

| | | | |
|---|---|---|---|
| 3,279,583 A | 10/1966 | Abegglen | |
| 3,334,723 A | 8/1967 | Reed et al. | |
| 3,926,298 A | 12/1975 | Miller | |
| 3,983,988 A * | 10/1976 | Maxted et al. | 198/370.09 |
| 4,328,889 A | 5/1982 | Maxted | |
| 4,369,873 A * | 1/1983 | Heuft | 198/367 |
| 4,696,386 A * | 9/1987 | Lem | 198/370.09 |
| 4,703,844 A | 11/1987 | Jahns | |
| 4,746,003 A | 5/1988 | Yu et al. | |
| 4,798,275 A | 1/1989 | Leemkuil et al. | |
| 5,029,693 A | 7/1991 | Williams | |
| 5,117,961 A | 6/1992 | Nicholson | |
| 5,145,049 A * | 9/1992 | McClurkin | 198/374 |
| 5,165,516 A | 11/1992 | Reed et al. | |

(Continued)

FOREIGN PATENT DOCUMENTS

GB    2082997 A  *  3/1982

(Continued)

OTHER PUBLICATIONS

International Search Report and Written Opinion, PCT/US2007/068778, filed May 11, 2007, International Bureau of WIPO, 12 pp.

*Primary Examiner*—Mark A Deuble
(74) *Attorney, Agent, or Firm*—Cook Alex Ltd.

(57) ABSTRACT

A narrow belt conveyor system is provided with a pop-up style diverter comprising a plurality of rows of diverter wheels in which each row raises and lowers independently of any of the other rows. Thus, each row of diverter wheels can be raised before the leading edge of a conveyed article reaches that particular row of diverter wheels and lowered after the trailing edge of the conveyed article has cleared that row. This permits the spacing between the articles to be greatly reduced, greatly increasing the article throughput rate and/or reducing the conveyor speed while achieving the same throughput rate.

18 Claims, 8 Drawing Sheets

U.S. PATENT DOCUMENTS

| | | | |
|---|---|---|---|
| 5,217,103 A | 6/1993 | Umlauf | |
| 5,427,223 A | 6/1995 | Van Den Goor | |
| 5,435,429 A | 7/1995 | Van Den Goor | |
| 5,551,543 A | 9/1996 | Mattingly et al. | |
| 5,657,858 A | 8/1997 | Van Den Goor | |
| 5,667,054 A | 9/1997 | Van Den Goor | |
| 5,695,042 A | 12/1997 | van der Burgt et al. | |
| 5,826,695 A | 10/1998 | Van Den Goor | |
| 5,826,704 A | 10/1998 | Van Den Goor | |
| 5,839,570 A | 11/1998 | Vertogen et al. | |
| 5,868,238 A | 2/1999 | Bonnet | |
| 5,909,797 A | 6/1999 | Van Den Goor | |
| 5,944,171 A | 8/1999 | Vertogen et al. | |
| 5,971,132 A * | 10/1999 | Bonnet | 198/370.07 |
| 5,971,133 A * | 10/1999 | Wilkins | 198/370.09 |
| 6,105,751 A | 8/2000 | Jentjens et al. | |
| 6,125,765 A | 10/2000 | Loomer | |
| 6,202,825 B1 | 3/2001 | Van Den Goor | |
| 6,283,271 B1 | 9/2001 | Van Den Goor | |
| 6,359,247 B1 | 3/2002 | Lem et al. | |
| 6,378,687 B1 | 4/2002 | Lem et al. | |
| RE37,747 E | 6/2002 | Van Den Goor | |
| 6,419,074 B1 | 7/2002 | Rasile et al. | |
| 6,466,828 B1 | 10/2002 | Lem et al. | |
| 6,660,953 B2 | 12/2003 | Lem et al. | |
| 6,681,917 B2 | 1/2004 | Van Den Goor | |
| 6,702,095 B2 | 3/2004 | Van Heeswijk et al. | |
| 6,729,617 B1 | 5/2004 | Chaume et al. | |
| 6,843,365 B2 | 1/2005 | Baker | |
| 6,907,978 B2 | 6/2005 | Evans et al. | |
| 6,910,567 B2 | 6/2005 | Van Den Goor | |
| 7,040,477 B2 | 5/2006 | Brixius et al. | |
| 7,040,478 B2 | 5/2006 | Ehlert | |
| 7,070,478 B2 | 7/2006 | Elledge et al. | |
| 2004/0104100 A1 | 6/2004 | Schiesser et al. | |
| 2004/0232056 A1 | 11/2004 | Groot et al. | |
| 2005/0077144 A1 | 4/2005 | Berkers et al. | |
| 2005/0274589 A1 | 12/2005 | Groot et al. | |

FOREIGN PATENT DOCUMENTS

| | | | |
|---|---|---|---|
| JP | 58183521 A | * | 10/1983 |

* cited by examiner

SEQUENTIAL DIVERTER FOR NARROW BELT CONVEYOR AND ASSOCIATED METHODS

CROSS REFERENCE TO RELATED APPLICATION

This application claims the benefit of the filing date of the U.S. Provisional Patent Application, Ser. No. 60/812,286, filed Jun. 9, 2006, which is herein incorporated by reference.

BACKGROUND OF THE INVENTION

Figure 1:
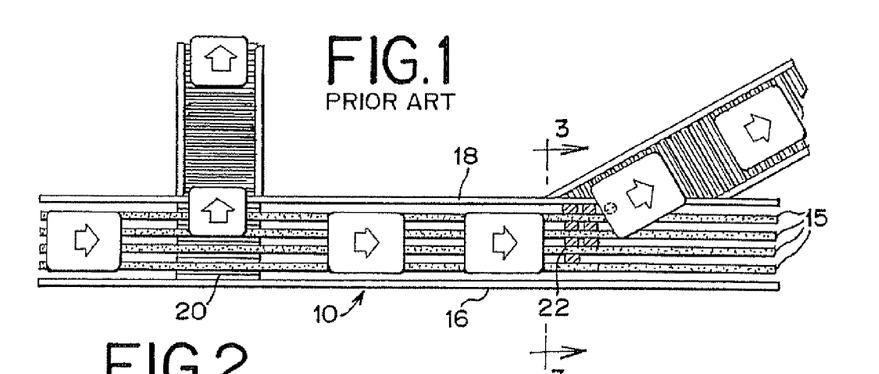
FIG. 1 is a top view of a prior art narrow belt conveyor system having a 90 degree diverter module and a 30 degree diverter module associated therewith.
Figure 2:
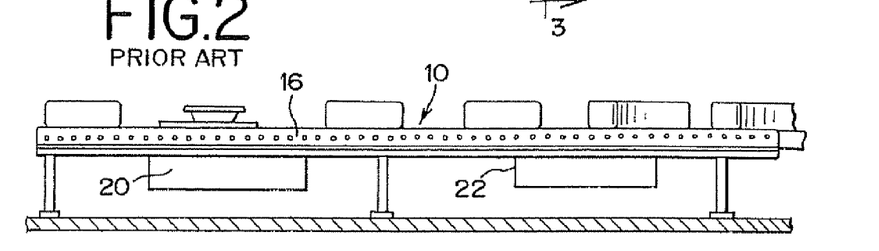
FIG. 2 is a side view of the prior art narrow belt conveyor system of FIG. 1.

A narrow belt conveyor system is shown in U.S. Pat. No. 6,843,365, which is incorporated herein by reference. Narrow belt conveyor systems utilize a plurality of continuously moving parallel belts for conveying flat-bottomed objects along straight runs. Such a system is shown generally in FIGS. 1 and 2, and is generally designated 10. The system includes multiple belts 15 supported between opposed side frames 16 and 18. While four belts 15 are shown in FIGS. 1 and 2, more or less can be used, as required. The spaces between the belts readily accommodate pop-up transfers and diverters, such as the 90 degree transfer 20 and the 30 degree diverter 22, to direct conveyed articles to an appropriate destination. As best seen in FIG. 1, the pop-up diverter 22 comprises a plurality of wheels 24 arranged between the spaced belts 15 in three rows to present, when viewed from above, a generally triangular array.

Figure 3:
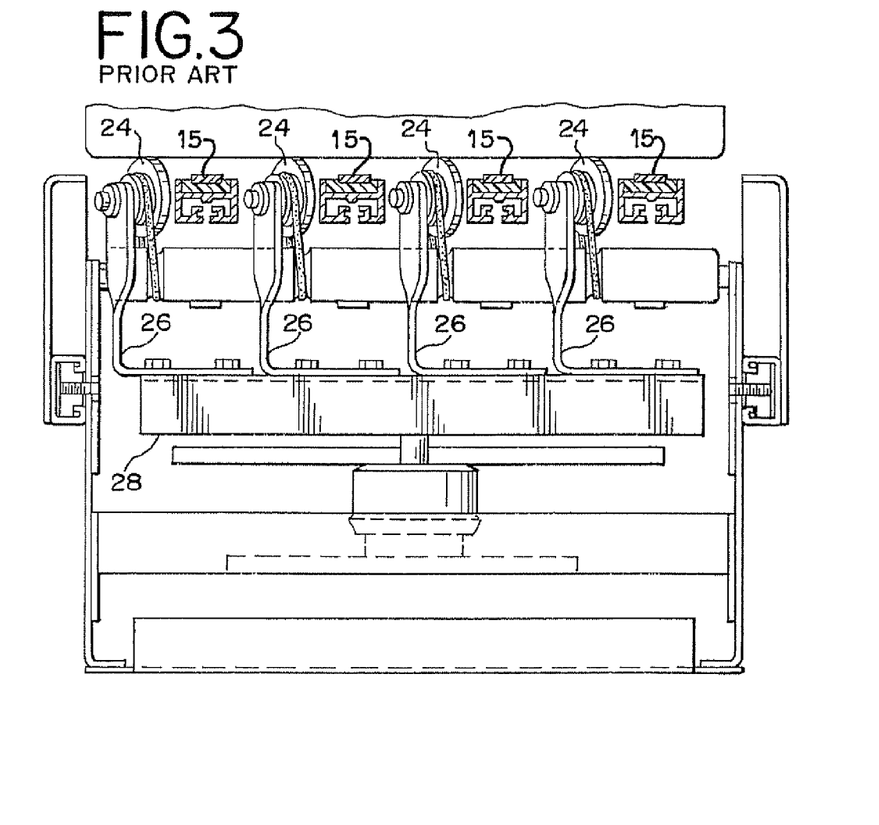
FIG. 3 is an enlarged cross-sectional view taken along line 3-3 of FIG. 1 showing a 30 degree diverter as known in the prior art.

Efforts are always being made to increase the rate at which items can be handled by a conveyor system, sometimes referred to as the throughput rate. One way to increase the throughput rate is to increase the speed of the conveyor. A second way to increase the throughput rate is to reduce the gap between articles conveyed on the system. However, the extent to which the second way can be utilized has heretofore been limited by the size of the diverter unit. Specifically, and with reference to FIGS. 1 and 3, all the diverter wheels of the pop-up diverter are carried on brackets 26 that are typically mounted on a common frame or support member 28 so that they are all raised and lowered in unison. Thus, the minimum spacing or gap between adjacent conveyed articles that pass over the diverter 22 must be greater than the distance across all the rows of wheels 24 that comprise the diverter so that the trailing edge of a first conveyed article completely clears the diverter section before the leading edge of the next conveyed article arrives. As can be appreciated, this puts a lower limit on the space or gap between conveyed articles, thus limiting the extent to which spacing can be reduced to maximize the rate at which articles can be handled by the conveyor. Accordingly, it is an object of the present invention to overcome the limitations inherent in prior art diverter systems to increase the throughput rate of a narrow belt conveyor system.

SUMMARY OF THE INVENTION

This object, as well as others that will become apparent upon reference to the following detailed description and accompanying drawings, are provided by a pop-up style diverter comprising a plurality of rows of diverter wheels in which each row raises and lowers independently of any of the other rows. Thus, each row of diverter wheels can be raised immediately before the leading edge of a conveyed article reaches that particular row of diverter wheels and lowered immediately after the trailing edge of the conveyed article has cleared that row. This permits the gap or spacing between the articles to be greatly reduced, greatly increasing the article throughput rate and/or reducing the conveyor speed while achieving the same throughput rate.

More specifically, a conveyor system is provided that comprises a plurality of endless narrow belts that support the conveyed articles. A diverter is provided for directing conveyed articles off the narrow belts onto a spur to a first destination in which the diverter comprises a plurality of rotating wheels located between the narrow belts and oriented obliquely to the narrow belts in a plurality of rows. The diverter wheels in each row are mounted so as to be raised and lowered in unison independently of the diverter wheels in any other row. The diverter wheels move from a first position in which the wheels are entirely beneath the upper surface of the narrow belts to a second position in which a portion of the wheel protrudes above the upper surface of the narrow belts so that they can support an article being conveyed over them.

In another aspect of the invention, a controller is provided for sequentially raising and lowering the rows of wheels so that each row of diverter wheels is raised just before a first item to be diverted passes over that row of wheels and is lowered either after the first item has cleared that row of wheels or just before a second item not to be diverted passes over that row of wheels.

In another aspect of the invention, a support is provided for each row of wheels and an actuator for each support so as to move the support between the first and second positions.

In another aspect of the invention, a method for operating a conveyor system that comprises at least one conveyor belt and a diverter comprising at least two rows of diverter wheels, each row of diverter wheels being capable of raising and lowering independently of the other row. In accordance with the method, a first destination code is assigned to each conveyed item that is to be diverted and a second destination code, different from the first, is assigned to each conveyed item that is not to be diverted. The movement of the conveyor belt is measured with an encoder that generates a pulse for each increment of movement of the conveyor. The movement and position of the conveyed items are tracked along the conveyor, and a separate raise signal for each row of diverter wheels is generated to sequentially raise the rows of the diverter wheels when each conveyed item that is assigned the first destination code reaches a predetermined position upstream of each of the rows of diverter wheels. A separate lower signal is generated for each row of diverter wheels to sequentially lower the rows of diverter wheels.

In keeping with another aspect of the invention, the lower signal is generated when each conveyed item that is assigned the first destination code reaches a predetermined position downstream of each row of diverter wheels. Alternatively, or additionally, a lower signal for each row of diverter wheels may be generated at a specified time after the raise signal for each row has been generated.

DETAILED DESCRIPTION

Turning to FIGS. 4-11, a pop-up diverter module according to the present invention, generally designated 50, is shown. The diverter module 50 shown is for a "right hand" divert with respect to the direction of travel of the conveyed items. In a "left hand" divert, mirror image versions of the various component parts would be required.

The diverter module 50 is shown in conjunction with eight narrow conveyor belts 52, although more or fewer may be used, depending upon the size of the articles to be conveyed. The illustrated diverter module 50 comprises six rows 54, 56, 58, 60, 62 and 64 of diverter wheels 66, each row having seven diverter wheels 66. Again, more or fewer may be used depending on the user's requirements The wheels 66 are oriented obliquely with respect to the direction of travel of the narrow belts. In the illustrated embodiment, the diverter wheels are at an angle of 30 degrees with respect to the direction of travel of the belts 52, although other angles oblique to the direction of travel may be chosen As shown, the wheels 66 of each row are spaced between the sideframe and rightward seven belts 52.

Figure 4:
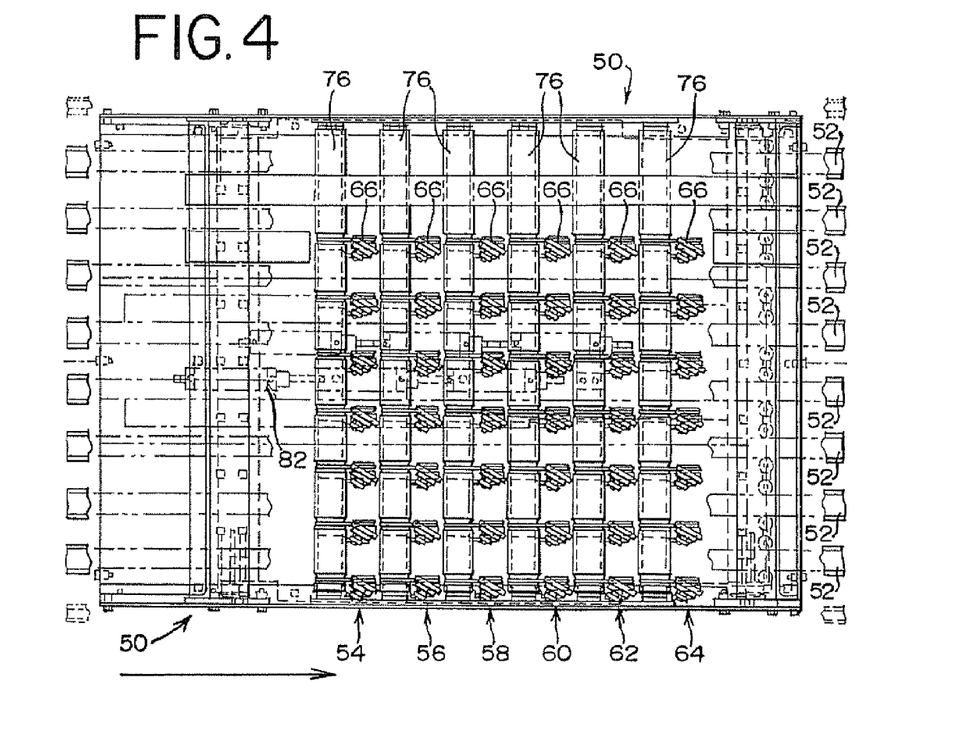
FIG. 4 is a top view of a sequential diverter module in accordance with the present invention.
Figure 5:
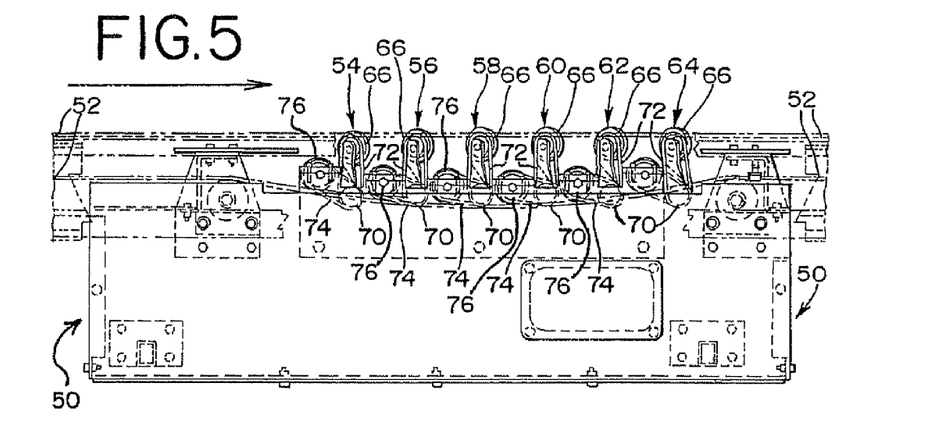
FIG. 5 is a side view of the sequential diverter module of FIG. 4.
Figure 6:
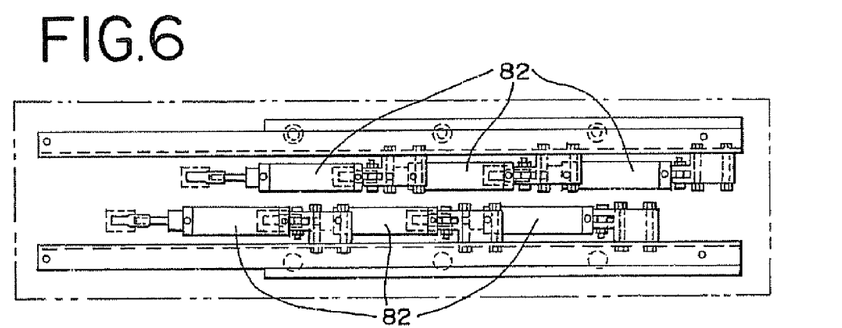
FIG. 6 is an enlarged plan view of the separate actuators for each of the rows of the diverter wheels for the sequential diverter module of the present invention.
Figure 7:
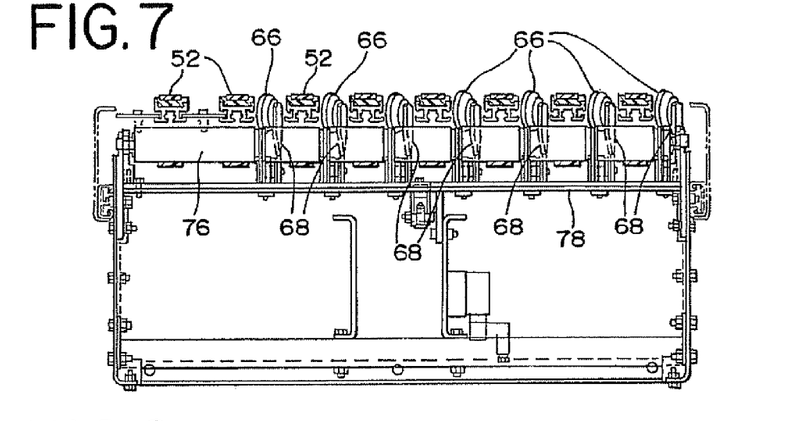
FIG. 7 is an end view showing a single row of diverter wheels.
Figure 9:
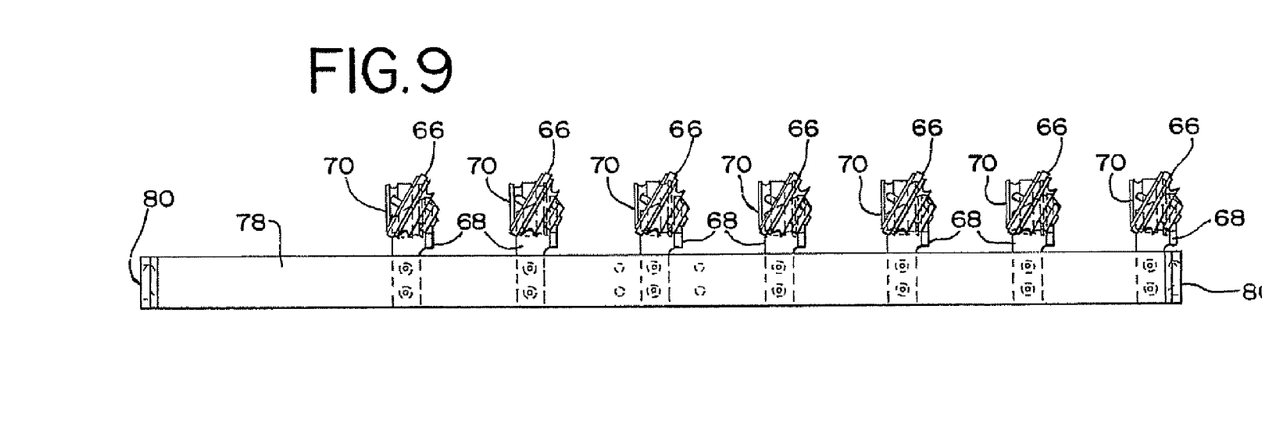
FIGS. 9, 10 and 11 are top, end and side views of a single row of diverter rows for use in the present invention.
Figures 10, 11:
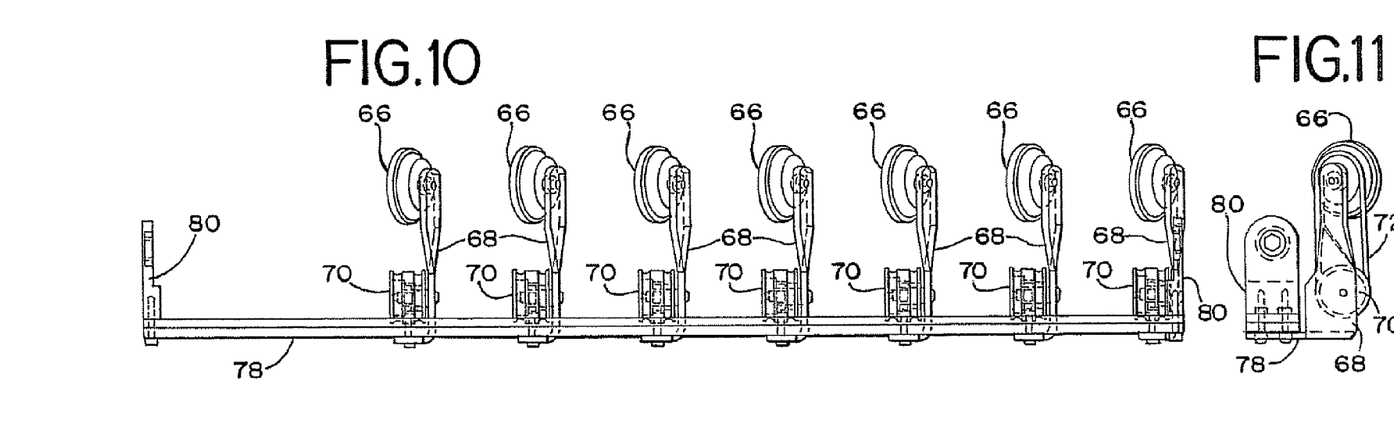

As best seen in FIGS. 9-11, each of the diverter wheels 66 is mounted to a wheel bracket 68 so as to be freely rotatable. An idler wheel 70 is also rotatably mounted to each wheel bracket 68 Each idler wheel 70 includes two grooves for seating two O-ring drive belts A first drive belt 72 (best seen in FIG. 11) operatively connects an idler wheel 70 to its associated diverter wheel 66. A second drive belt 74 (best seen in FIG. 5) operatively connects an idler wheel 70 to its associated drive roller 76. As best seen in FIGS. 4 and 5, a separate drive roller 76 is associated with each row 54-64 of diverter wheels 66. The drive rollers 76 are mounted between the side frames of the conveyor system on a stationary axle so that the drive rollers 76 are frictionally engaged by the top sides of the return runs of the belts 52. Thus, the drive rollers 76 are continuously rotated as long as the belts 52 are moving, and, consequently, the drive rollers 76 continuously rotate their associated idler wheels 70/diverter wheels 66.

In keeping with the invention, each row 54-64 of diverter wheels 66 is adapted to be raised and lowered independently of the other rows. To this end, each row of wheel 66 preferably comprises a cross member 78 (best seen in FIGS. 9-11) to which the brackets 68 supporting the diverter wheel 66 are attached. The cross member 78 is pivotally secured between the side frames by a pivot block assembly 80 secured to each of the opposite ends of the cross member 78. The cross member 78 for each row of diverter wheels 66 has an actuator 82 associated therewith to arcuately pivot the cross member 78 (and thus its associated diverter wheels 66) between a first position in which the diverter wheels 66 are entirely beneath the top surface of the belts 52 to let conveyed articles to pass straight through (shown in dotted lines in FIG. 8), and a second position in which the diverter wheels protrude above the belts 52 to redirect or divert the conveyed articles passing over to a spur. As shown, the actuators 82 are piston actuators, with their piston rods operatively connected to the cross member 78. The pistons are preferably pneumatically or hydraulically controlled. However, other types of actuators, such as servo motors, may be used.

Figure 8:
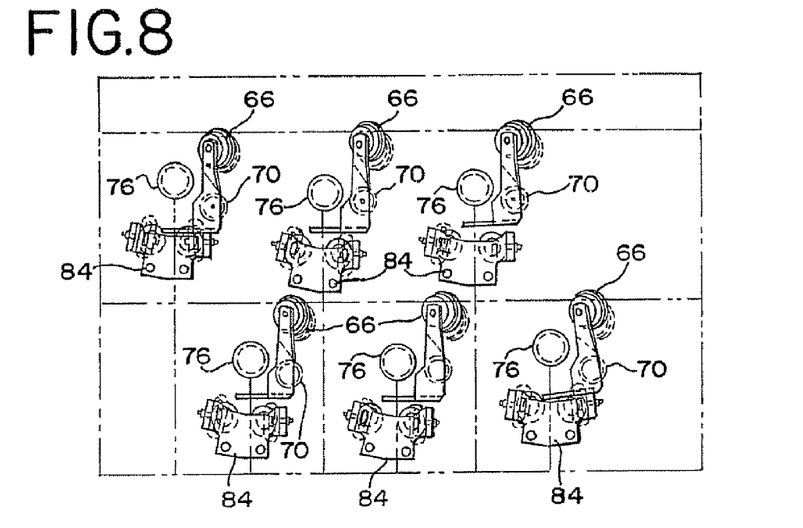
FIG. 8 is a schematic side view showing the relationship between the rows of the diverter wheels and the top of the conveying belts of the associated belts of the narrow belt conveyor system.

As best seen in FIG. 8, bumper brackets 84 including two rubber ovals are secured to the side frame to limit the pivoting movement of the cross member 78 and to provide for noise reduction, With reference to FIG. 8, the extent to which the diverter wheel 66 in the various rows of diverter wheels raises above the belt 52 varies depending upon the row. Specifically, the first two rows of diverter wheels 66 protrude a height less than that of rows 3-6 to provide for a gradual raising of a conveyed article to the full height. In a preferred embodiment, the diverter wheels 66 in the first row 54 protrude ⅛ inch above the surface of the belts 52; the diverter wheels 66 in the second row 54 protrude ¼ inch above the belts 52; and the diverter wheels in the third through sixth rows 56-64 protrude ⅜ inch above the belts 52.

The invention also comprises a system for controlling the diverter 50 Movement of the sortation conveyor belt surface is measured with an incremental encoder, shown in FIGS. 12-20 as "E". By way of example, each inch (approximately) of conveyor movement results in one pulse output from the encoder. Since cartons move at the conveyor speed, the encoder output is a direct indication of carton movement on the conveyor. Similar tracking can be done with an absolute encoder.

Figure 12:
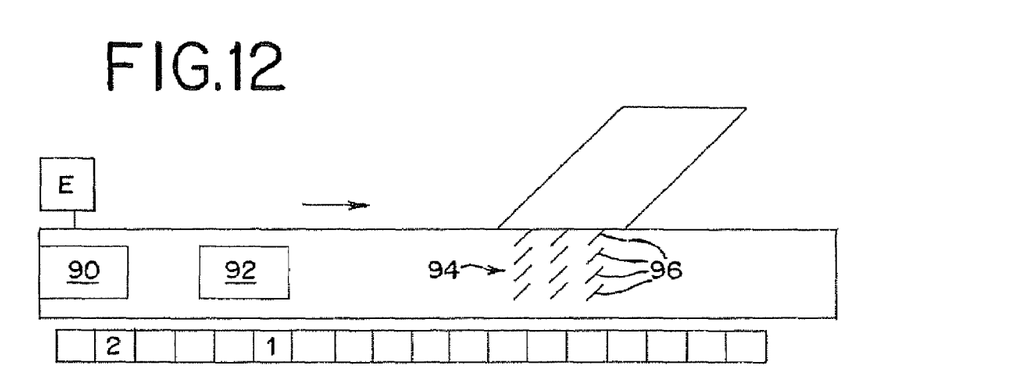
FIGS. 12-20 are schematic top views showing the operation of a narrow belt conveyor system having a sequential diverter module according to the present invention.
Figure 13:
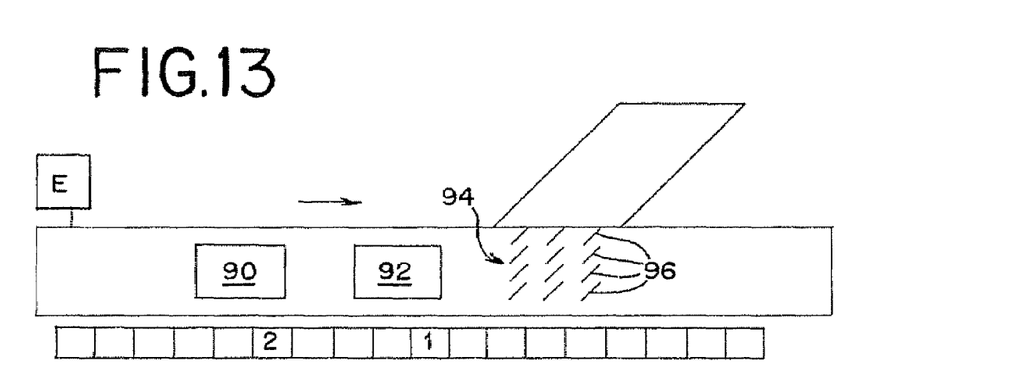
Figure 14:
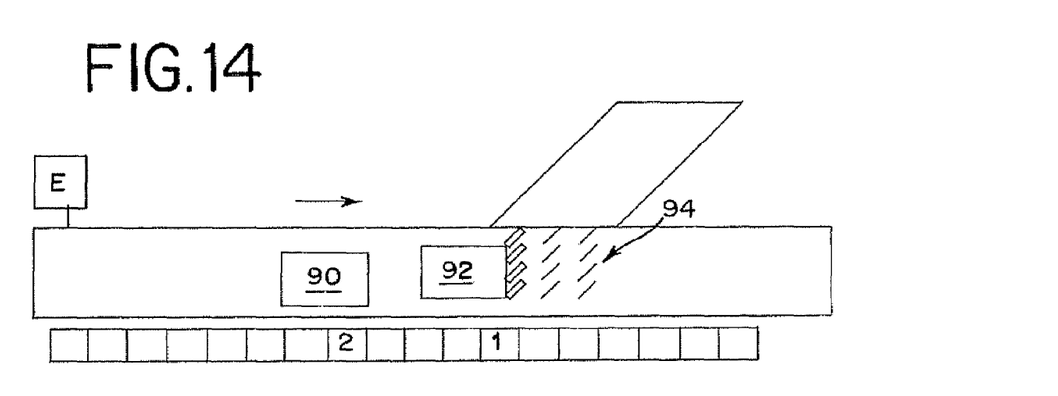
Figure 15:
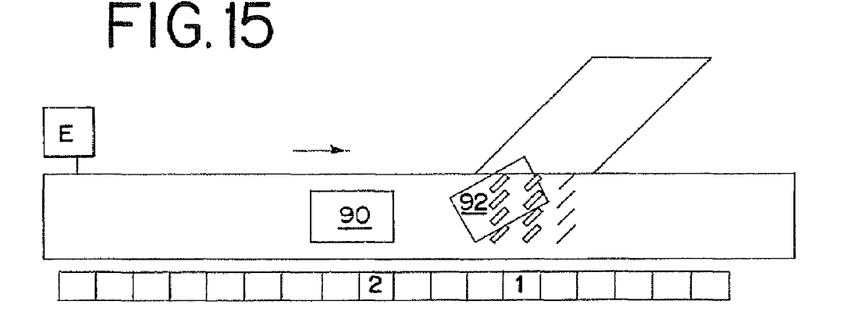
Figure 16:
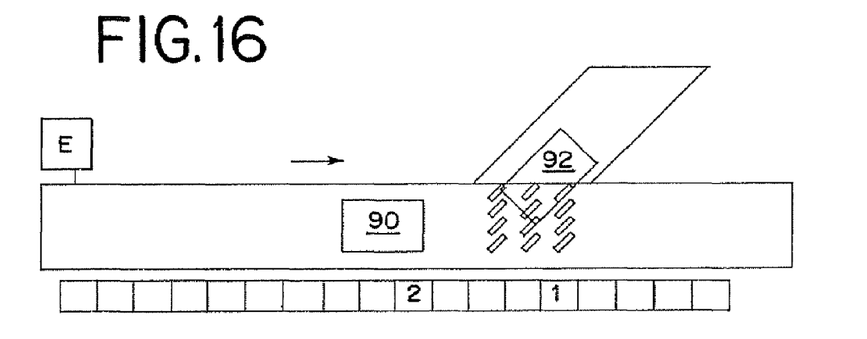
Figure 17:
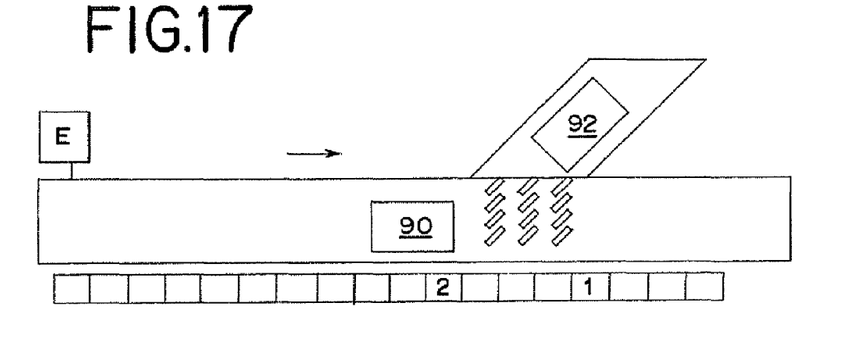
Figure 18:
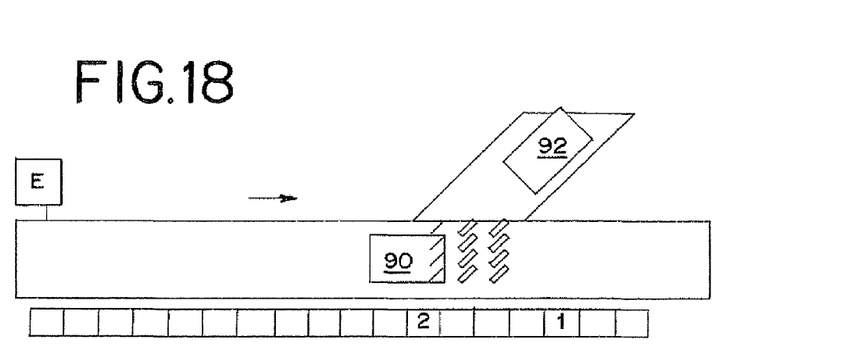
Figure 19:
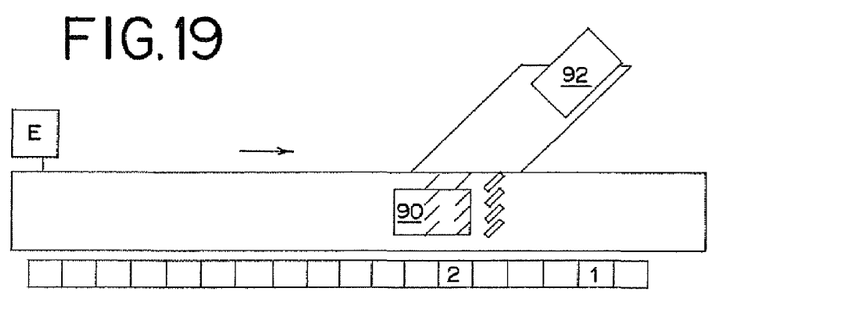
Figure 20:
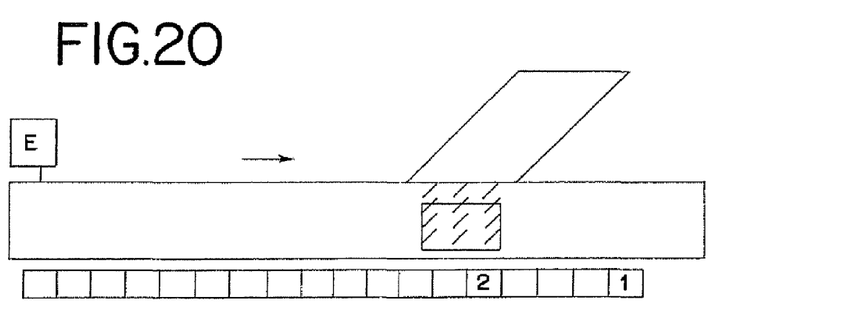

Referring to FIG. 12, two cartons 90, 92 are shown moving on the conveyor. The downstream carton 92 is addressed to a first diverter 94. The second, upstream carton 90, is addressed to a second diverter (not shown), which is somewhere downstream of diverter 94.

Shown just underneath the conveyor in FIG. 12 is a data table which keeps track of the destinations of cartons as they move down the conveyor "1" represents the destination of the first (down stream) carton 92, and "2" represents the destination of the second (upstream) carton 90. As cartons 92, 90 move down the conveyor, the incoming encoder pulses are used to shift the destination data in the data table in a manner synchronous with the carton movement.

Three rows of diverter wheels for diverter 94 are shown in FIGS. 12-20 as diagonal slashes 96, either lowered (thin lines) or raised (bold lines) However, the control sequence as described can be applied to diverters with any number of two or more rows of diverter wheels. In keeping with the invention, each row is individually controlled. One data table position corresponds to each row of diverter wheels. When a value of 1 is moved into one specific data table position, the corresponding row of diverter wheels is given a "raise" signal The row of diverter wheels is raised and stays in the raised position until a "lower" signal is received. When a value not equal to 1 or zero is moved into same data table position, the row of diverter wheels is given a "lower" signal. The row of diverter wheels is then lowered and stays in the lowered position until a "raise" signal is once again received FIGS. 12-20 show a sequence of two cartons following each other. The first carton 92 is destined for diverter 1. As carton 92 it approaches diverter 94, the three rows of wheels are sequentially raised, based on the data values in the data table, so as to be in the raised position just prior to the leading edge of the carton 92 reaching each row of wheels. The second carton 90 is intended to be conveyed to a destination beyond the diverter 94. As carton 90 approaches diverter 94, the three rows of wheels are sequentially lowered, so as to be in the lowered position just prior to the leading edge of the carton 90 reaching each row of wheels Thus the second carton 90 passes diverter 94 without being diverted.

The diverter wheels can also be lowered based on time, not in place of but in addition to the lowering logic described above. For example, a row of diverter wheels can be lowered if a raise signal has not been received within the previous three seconds. This insures that a row of wheels does not remain in the raised position should there not be any more cartons traveling down the conveyor.

Figure 21:
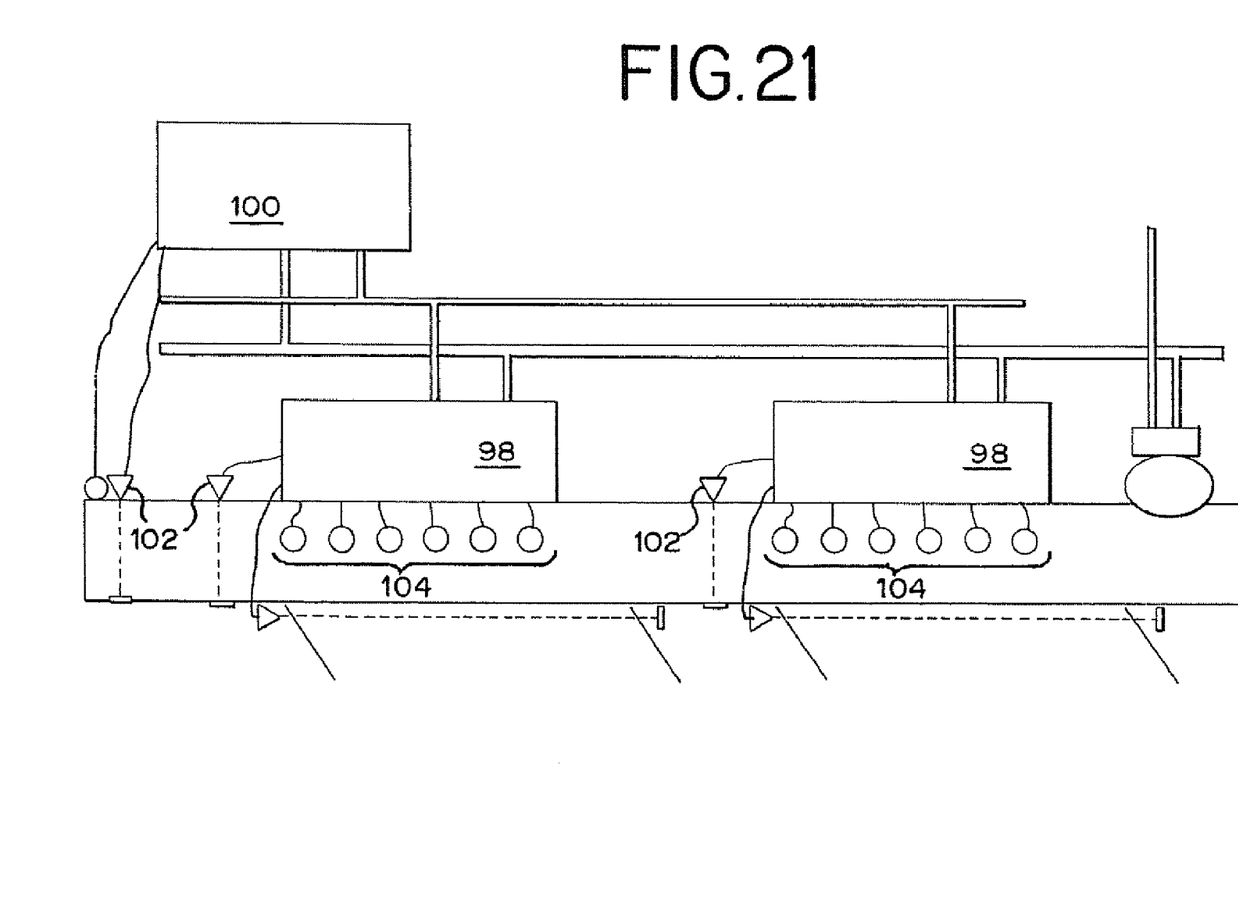
FIG. 21 is a schematic diagram of the controller for the sequential diverter module of the present invention.

The diverter of the present invention requires high speed control of the individual rows of diverter wheels. In practice, this requires receiving sensor input signals and triggering outputs with a repeatability of within 10 milliseconds. With reference to FIG. 21, a high speed controller 98 is provided for each diverter to handle all diverter control functions, and specifically directing each row of diverter wheels to either raise or lower at the proper time to affect a divert.

A sortation controller 100 is used to control the entire conveyor system The controller 100 determines the destinations of all products introduced to the conveyor system, and tracks the movement of the product as it is conveyed along the conveyor system. The sortation controller 100 receives inputs from photosensors 102 and encoders, and operates motor drives and the controller 98.

The sortation controller 100 communicates to the individual diverter controllers 98 over a bus network, such as "DeviceNet," available from Rockwell Automation. The sortation controller 100 signals a specific controller 98 when a product on the conveyor is within a specified short distance of the divert position associated with the controller 98. The controller 98 then creates a time window, which is a fixed time period during which an induct photosensor is armed to look for approaching conveyed product. If the product's leading edge blocks the induct photosensor within the time window, the controller 98 then takes over tracking of the product, activating or deactivating the actuators 104 associated with the controller 98 as required to raise and lower the six rows of divert wheels in the required timing sequence If the product's leading edge blocks the induct photosensor when there is no time window present, the controller 98 will then cause the deactivating of the actuators associated with the controller 98 as required to lower the rows of diverter wheels in the required timing sequence.

Accordingly, a diverter system and method of operation has been provided that fully meets the objects of the present invention. While the invention has been described in terms of a preferred embodiment, there is no intent to limit it to the same. For example, while the diverter rollers in the described embodiment are pivoted in an arcuate motion between their lowered and raised positions, the diverter rollers could be mounted so as to move linearly along, e.g., a track between their lowered and raised positions Thus, the scope of the invention is defined by the following claims.

What is claimed:

1. A conveyor system comprising:
   a plurality of endless narrow belts for supporting conveyed articles; and
   a diverter for directing conveyed articles off the narrow belts on to a spur to a first destination, the diverter comprising a plurality of rotating wheels located between the narrow belts oriented obliquely to the narrow belts and arranged in a plurality of rows, the diverter wheels in each row being mounted to be raised and lowered in unison independently of the diverter wheels in any other row from a first position in which the wheels are entirely beneath the upper surface of the narrow belts to a second position in which a portion of the wheels protrudes above the upper surface of the narrow belts.

2. The conveyor system of claim 1 further comprising a controller for sequentially raising and lowering the rows of wheels so that each row of diverter wheels is raised before a first item being transported by the conveyor passes over that row of wheels and is lowered after the first item has cleared that row of wheels, provided that a second, following item is not going to the first destination.

3. The conveyor system of claim 1 further comprising a support for each row of wheels and an actuator for each support to move the support between the first and second positions.

4. The conveyor system of claim 3 wherein the support for each row of wheels is pivotably mounted to the conveyor so that the wheels move in an arcuate motion between the first and second positions.

5. The conveyor system of claim 4 further comprising:
   a drive roller associated with each row of diverter wheels, the drive roller being contacted by at least one of the narrow belts so as to impart rotation to the drive roller
   an idler wheel associated with each diverter wheel;
   a first belt associated with each diverter wheel to operatively connect each idler wheel to its diverter wheel; and
   a second belt associated with each idler wheel to operatively connect each idler wheel to the drive roller;
   such that rotation is imparted to the diverter wheels through the drive roller when the narrow belt is moving.

6. A conveyor system comprising:
   a plurality of endless narrow belts for supporting conveyed articles; and
   a diverter for directing conveyed articles off the narrow belts on to a spur to a first destination, the diverter comprising a plurality of rotating wheels located between the narrow belts oriented obliquely to the narrow belts and arranged in a plurality of rows, the diverter wheels in each row being mounted to be raised and lowered in unison independently of the diverter wheels in any other row from a first position in which the wheels are entirely beneath the upper surface of the narrow belts to a second position in which a portion of the wheels protrudes above the upper surface of the narrow belts, wherein the amount which the wheels protrude above the upper surface of the narrow belts when in the second position increases in the direction of travel of the narrow belts.

7. The conveyor system of claim 6 further comprising a controller for sequentially raising and lowering the rows of wheels so that each row of diverter wheels is raised before a first item being transported by the conveyor passes over that row of wheels and is lowered after the first item has cleared that row of wheels, provided that a second, following item is not going to the first destination.

8. The conveyor system of claim 6 further comprising a support for each row of wheels and an actuator for each support to move the support between the first and second positions.

9. The conveyor system of claim 8 wherein the support for each row of wheels is pivotably mounted to the conveyor so that the wheels move in an arcuate motion between the first and second positions.

10. The conveyor system of claim 9 further comprising:
a drive roller associated with each row of diverter wheels, the drive roller being contacted by at least one of the narrow belts so as to impart rotation to the drive roller;
an idler wheel associated with each diverter wheel;
a first belt associated with each diverter wheel to operatively connect each idler wheel to its diverter wheel; and
a second belt associated with each idler wheel to operatively connect each idler wheel to the drive roller;
such that rotation is imparted to the diverter wheels through the drive roller when the narrow belt is moving.

11. A method of operating the conveyor system comprising at least one conveyor belt and a diverter comprising at least two rows of diverter wheels, each row of diverter wheels being capable of raising and lowering independently of the other row, the method comprising:
assigning a first destination code to each conveyed item to be diverted and a second destination code different from the first for each conveyed item that is not to be diverted;
measuring the movement of the conveyor belt with an encoder that generates a pulse for each increment of movement of the conveyor;
tracking the movement and position of the conveyed items along the conveyor;
generating a separate raise signal for each row of diverter wheels to sequentially raise the rows of diverter wheels when each conveyed item that is assigned the first destination code reaches a predetermined position upstream of each row of diverter wheels; and
generating a separate lower signal for each row of diverter wheels to sequentially lower the rows of diverter wheels.

12. The method of claim 11 wherein the lower signal is generated when each conveyed item that is assigned the first destination code reaches a predetermined position downstream of each row of diverter wheels.

13. The method of claim 11 wherein the lower signal for each row of diverter wheels is generated a specified time after the raise signal for each row was generated.

14. A method for minimizing the spaces between at least first and second conveyed items on conveyor system in which the first conveyed item is to be diverted and the second conveyed item is not to be diverted, the conveyor system comprising at least one conveyor belt and a diverter comprising at least two rows of diverter wheels, each row of diverter wheel being capable of raising and lowering independently of the other row, each conveyed item having a leading edge and a trailing edge, the method comprising:
determining the positions of each of the conveyed items on the conveyor system;
raising each row of diverter wheels immediately before the leading edge of the first conveyed item passes over each row of diverter wheels; and
lowering each row of diverter wheels immediately before the leading edge of the second conveyed item passes over each row of converter wheels.

15. A method for minimizing the spaces between at least one first and at least one second conveyed items on conveyor system in which each first conveyed item is to be diverted and each second conveyed item is not to be diverted, the conveyor system comprising at least one conveyor belt and a diverter comprising at least two rows of diverter wheels, each row of diverter wheel being capable of raising and lowering independently of the other row, each conveyed item having a leading edge and a trailing edge, the method comprising:
assigning a first destination code to each first conveyed item to be diverted and a second destination code different from the first for each second conveyed item that is not to be diverted;
measuring the movement of the conveyor belt with an encoder that generates a pulse for each increment of movement of the conveyor;
tracking the movement and position of the conveyed items along the conveyor so as to determine the positions of each of the conveyed items on the conveyor system;
generating a separate raise signal for each row of diverter wheels to sequentially raise the rows of diverter wheels when each conveyed item that is assigned the first destination code reaches a predetermined position upstream of each row of diverter wheels;
generating a separate lower signal for each row of diverter wheels to sequentially lower the rows of diverter wheels;
raising each row of diverter wheels immediately before the leading edge of each first conveyed item passes over each row of diverter wheels; and
lowering each row of diverter wheels immediately before the leading edge of each second conveyed item passes over each row of diverter wheels.

16. The method of claim 15 wherein the lower signal is generated when each conveyed item that is assigned the second destination code reaches a predetermined position upstream of each row of diverter wheels.

17. The method of claim 15 wherein the lower signal is generated when each conveyed item that is assigned the first destination code reaches a predetermined position downstream of each row of diverter wheels.

18. The method of claim 15 wherein the lower signal for each row of diverter wheels is generated a specified time after the raise signal for each row was generated.

* * * * *